UNITED STATES PATENT OFFICE.

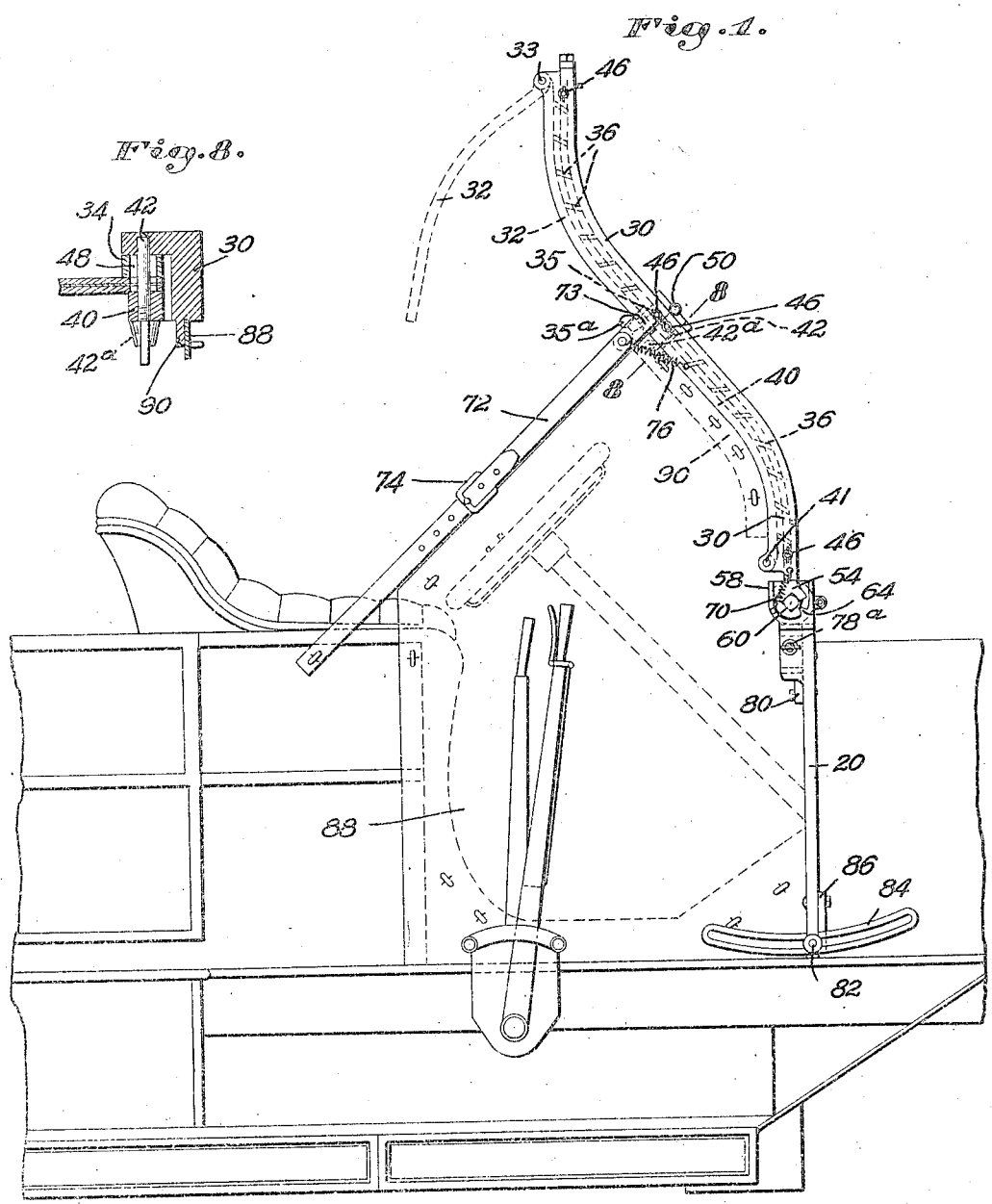

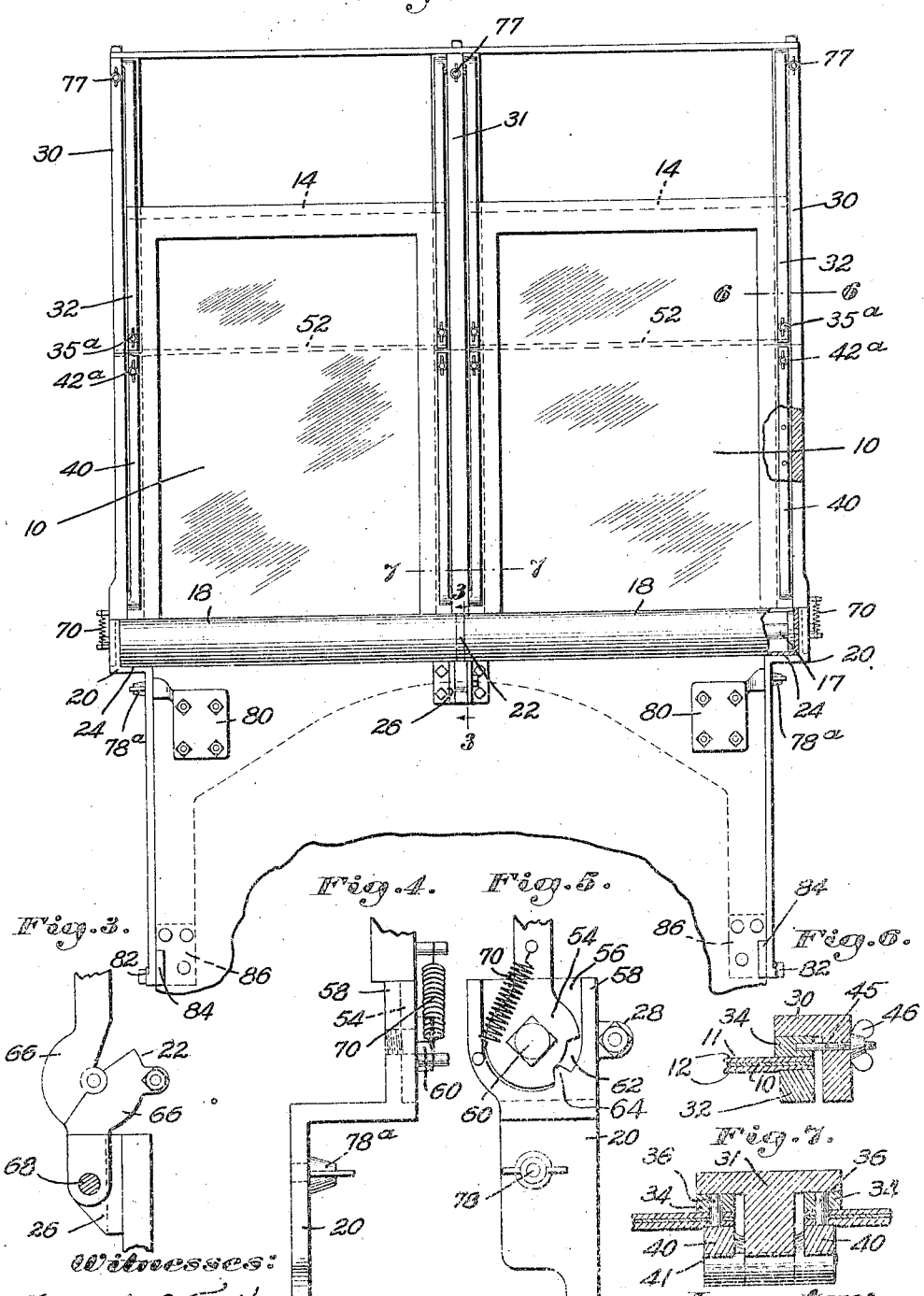

GUY B. COLLIER, OF KINDERHOOK, NEW YORK.

AUTOMOBILE WIND-SHIELD.

1,074,774.

Specification of Letters Patent.

Patented Oct. 7, 1913.

Application filed August 8, 1910. Serial No. 576,090.

*To all whom it may concern:*

Be it known that I, GUY B. COLLIER, a citizen of the United States, and a resident of Kinderhook, in the county of Columbia and State of New York, have invented an Improvement in Automobile Wind-Shields, of which the following description, in connection with the accompanying drawings, is a specification, like letters on the drawings representing like parts.

This invention relates to protective curtains and the like, such as wind shields, for automobiles and other vehicles.

Among other objects the invention is intended to provide a construction adapted for ready adjustment for different degrees of protection as may be desired.

The character of the invention may be best understood by reference to an illustrative embodiment shown in the accompanying drawings in which;

Figure 1 is a side elevation of a fragmentary view of an automobile having thereon protective devices embodying the invention: Fig. 2 is a rear elevation (viewed from left toward right in Fig. 1) of the transverse wind shield shown in Fig. 1; Figs. 3, 4 and 5 are detached detail views more fully referred to hereinafter; Fig. 6 is a detail section on a line 6—6 of Fig. 2; Fig. 7 is a detail section on a line 7—7 of Fig. 2; and Fig. 8 is a detail section on a line 8—8 of Fig. 1.

An illustrative protective device, shown for illustration in the drawings, comprises a wind shield disposed in front of a seat, the illustrative form of wind shield comprising one or more curtains, preferably having flexible transparent panels 10—10 of celluloid or the like. Each panel is preferably such a unitary curtain 11, comprising one or more layers of flexible material 12 (see Fig. 6). When two layers 12—12 are used the transparent panels 10 are preferably inserted between them as shown in Figs. 6 and 7. These parts may be united by cementing or in any other practicable manner.

The upper edge of the curtain 11 preferably has some provision for stiffening the same, for instance, as a bar 14 shown in dotted lines in Fig. 2, the same being of any practicable construction. The lower end of each curtain 11 is preferably secured to a spring roller 17, shown in Fig. 2, which roller may be of the well-known spring-curtain roller type, and is preferably mounted in a casing 18. From the roller 17 the curtain passes out of the casing 18 through an appropriately disposed slot and when the curtain is released to be wound to the fullest extent upon the roller 17, all, or substantially all, the entire curtain may be inclosed and protected within the casing 18.

The described arrangement of the curtain and casing provides a very compact and self-contained construction, such that the casing as a whole may be removed and stored away most conveniently, this being a consideration of substantial importance in shields and curtains for automobiles.

For the purpose of the specific illustrative apparatus shown in the drawings, two coaxial rollers 17, 17 are provided within the casings 18, 18 (see Fig. 2). Each of these abuts at one end against a frame member 20 and at its other end against a central frame member 22. Each of the outer frame members 20 is provided with a species of shelf or shoulder 24 upon which the casing 18 or its substitute may rest. Likewise the frame member 22 is provided with a shouldered bracket 26 for supporting the adjacent ends of the respective curtains. The opposite ends of each casing 18 are provided with ears corresponding and mating with ears 28 on the frame members 20 and 22. The coöperating ears are clamped together by suitable clamping bolts and nuts thereby maintaining the casings 18—18 securely in position resting upon the shoulders 24—24 and 26. By merely removing these clamping bolts from the ears 28 the casings 18—18 are freed and may be readily withdrawn.

Each curtain 11 is preferably maintained in extended position or positions by upright frame members 30 and 31. A frame member 30 is mounted on each side of the vehicle, for instance proximate the ends of the dash board; and each such frame member may be provided with one or more clamping devices 32 suitably related to the frame member so as to clamp a vertical edge of the curtain against the frame member. For instance, as shown in Fig. 1, a clamping member 32 may be hinged at 33 to a part of the frame member and adapted to swing to the dotted line position there shown. When the curtain is appropriately adjusted to a position between the frame member and the clamping member 32, the latter may be closed (from the dotted line position in Fig. 1 to the full line position) so as to clamp the curtain tightly against the frame member. The manner in which this is effected is illustrated in Fig. 6 in which the clamping member 32 is shown as pressing the curtain 11 against an illustrative accessory frame member 34 secured to the frame member 30, as will be more fully described hereinafter. In this manner the frame member 30 and clamping member 32 may provide a species of guiding slot and also clamping means for guiding and holding the curtain in place. When in clamping position, the clamping member may be secured in place by a bolt 35 mounted in the frame member 30 and having a thumb nut 35ª as shown in Figs. 1 and 2. For the purposes of the specific apparatus, there are two clamping members as will be presently explained.

If it be desired to provide some positive means for engaging the curtain or curtains in addition to the clamping means, or as a substitute therefor, pins 36 may be provided at convenient intervals along the length of the frame members 30 and 31. These pins herein are secured to the accessory frame member 34 (Fig. 7) and may be inclined as shown in Fig. 1 to provide in effect hooks or hangers over which appropriate eyes or grommets in the curtain edge portions may be placed. Fig. 7 well illustrates the arrangement of the illustrative pins as applied to the middle frame member 31 which, of course, has the pins and other parts duplicated on its opposite sides to accommodate the two illustrative curtains.

Each shield in the illustrative apparatus has both the described clamping member 32 and an additional clamping member 40 pivoted at 41 to the frame member and provided with a bolt 42 and thumb nut 42ª for holding it in place. Pins 36 may also be used with or instead of the clamping member 40. The pins 36 positively retain the edges of the curtain and prevent objectionable bulging of the flexible transparent shield, such as might otherwise occur from air pressure thereon.

To maintain these shields taut and take up any stretch thereof, the accessory frames 34 referred to preferably are adjustably connected to the frames 30. Herein this is effected by pins 45 (Figs. 6 and 8) fast in said frames 34, herein adjacent their upper and lower ends, and projecting through the frames 30, where they are threaded to receive thumb nuts 46. By turning the latter the frame 34 may be adjusted toward the frame 30 to take up any slack in the shield as desired. To prevent interference by the clamping bolts 35 and 42 with this adjustment, the accessory frame members may be slotted as at 48 (Fig. 8). This arrangement of two clamping members on each frame member provides conveniently for the jointed construction of the frame member shown for illustration in the drawings in which each frame member 30 comprises an upper arm and a lower arm jointed by a hinge 50 in such manner that the upper arm may be swung clockwise in Fig. 1 so that it shall occupy a retired position in front of the lower arm. Preferably the hinge 50 is so located that the upper edge of the shield as a whole will extend slightly below the plane of vision of the driver when the upper part of the wind shield is retired forwardly and downwardly to overlie the lower part of the shield. Added rigidity of the shield frame may be had by providing the hinges 50 with rods 52 extending horizontally from one frame to another as shown by dotted lines in Fig. 2.

When passengers are entering or leaving the vehicle, it is desirable to tilt the shield bodily forward away from the seats. To this end the side frame members 30 (Fig. 2) and the intermediate frame member 31 may be hinged to the dash of the vehicle. Herein each of the side members 31 has a disk like end 54 (Figs. 4 and 5) set in a U-shaped recess 56 in the outer face of an upward extension 58 on a frame member 20. The disk end may turn on a fulcrum screw 60 in the disk end 54 and threaded into the frame extension 58.

To limit the tilt of the shield the disk end may have an arcuate notch 62 adapted to receive a stop 64 projecting laterally from the frame extension 58. This stop is smaller than said notch and permits the disk end 54 to rock more or less before the ends of said notch will engage said stop. The intermediate frame member 31 may also be provided with means to limit the tilt of the shield. Herein said member is connected by hinged disk sections 66 (Fig. 3) to the dash bracket 26 referred to, the lower disk section being pivoted to said bracket at 68 for a purpose to be described. The frames 30 may be maintained in normal position (Fig. 1) by springs 70 (Figs. 4 and 5) connected to said frame and to frame fulcrum supports 58 and tend to keep the lower end of the disk notch 62 in engagement with the stop 64 (Fig. 5).

When passengers are entering or leaving the vehicle the shield frame may be tilted bodily forwardly against the resistance of the springs 70, this movement being limited by the engagement of the upper end of the notch 62 with the stop 64, the edge engagement of the hinged disk sections 66 (Fig. 3) contributing to the limiting of this movement.

To prevent vibration of and steady the shield tension straps 72 may be connected to the body of the vehicle conveniently adjacent the seat and pivotally connected to brackets 72 projecting laterally from the shield. A ready adjustment of the straps is had by a buckle 74. The brackets 73 preferably are located on the upper part of the shield above the hinge 50, and thereby tend to maintain said part in its up position. When the upper part of the shield is clockwise rocked or folded to depend and overlie the lower part of the shield, the shield end of the strap will be beneath the hinge 50 and said strap will effectually maintain the upper part of the shield in its down position also. The retention of the upper shield in its up and down positions may be further effected by springs 76 secured to the lower frames 30 and to the brackets 73 upon the upper frames. To hold the upper frame portion fast to the lower frame portion when folded to overlie the latter, the upper ends of frame members 30, 31 may be provided with thumb screws 77 for threaded engagement with the lower ends of said members.

In some instances it may be desirable to vary the permanent tilt of the shield independently of its described adjustment for permitting the entering and leaving of passengers. To this end the frame members 20 are pivoted on studs 78 projecting from brackets 80 secured to the dash. Said frame members depend from said pivot studs (Fig. 1) and at their lower ends are provided with adjustable bolts 82 received by arcuately slotted guides 84 carried by brackets 86 secured to said dash. By this arrangement the frame members 20 may be swung on their pivot studs and be held in various positions of angular adjustment adapted to the speed of travel of the vehicle or for other purposes as described.

Side shields 88 (Fig. 1) may be buttoned or otherwise secured to the vehicle body adjacent the seat and dash. The portions of these side shields adjacent the wind shield may be secured to flanges 90 projecting rearwardly from the side frames 30.

The slotted guide 84 preferably is offset somewhat from the edge of the dash to permit the swinging adjustment of the frame member 20 without interference with the side shields 88.

All the protective devices above described are light in weight and are very readily disorganized and assembled, and when detached and packed occupy but small space and can be stored very compactly. The features of adjustment are highly advantageous as will appear to those skilled in the art.

It is to be understood that the invention is by no means limited to the specific construction above described for purposes of illustration; on the contrary the invention may be variously embodied within the scope of the subjoined claims. It is not necessary that all the features of the invention be used conjointly, since they may be used to advantage separately in various combinations and sub-combinations.

Claims.

1. In a vehicle, the combination of extensible wind shield means, a frame therefor having longitudinal edge flanges extending laterally beyond said wind shield means, means engaging said flanges and cooperating with the wind shield, means for maintaining the latter shield means laterally taut, and clamping strips secured to said frame for holding said wind shield means in extended position.

2. In a vehicle, the combination of extensible wind shield means, a frame cooperating therewith and having longitudinal edge strips provided with wind shield receiving pins, and means engaging said edge strips for maintaining said wind shield means laterally and uniformly taut.

3. In a vehicle, the combination of a frame divided into parts hinged together, an extensible wind shield for adjustment along both of said parts, and clamping means on each of said parts and distinct from each other for securing said shield thereto in any of its positions along said parts.

4. In a vehicle, the combination of a frame, a wind shield supported thereby, means permitting a limited tilt of said shield to facilitate entrance into or departure of passengers from the vehicle, means whereby the frame may be adjusted to various angular positions as a whole relatively to the vehicle seat and secured in such position, and means automatically to restore said shield to normal position after tilting.

5. In a vehicle, the combination of a frame horizontally hinged to form upper and lower portions, an extensible wind shield for adjustment to any elevation along each of said portions and clamping strips distinct from each other and cooperating with said upper and lower portions for securing said shield thereto.

6. In a vehicle, the combination of upper and lower frames horizontally hinged together, the upper frame being constructed and arranged to rock down and overlie the lower frame and an extensible flexible wind shield adjustable to extend along both of said frames when the upper frame is in its upward position and adjustable to extend along the lower frame when said upper frame is rocked to overlie said lower frame.

7. In a vehicle, the combination of extensible wind shield means, a frame therefor, a clamping strip pivoted at one of its ends to said frame and means cooperating therewith for securing the shield means in different extended positions.

8. In a vehicle, the combination of extensible wind shield means, a frame therefor having longitudinal edge flanges extending laterally beyond said wind shield means, pins projecting from said frame to engage the edges of said wind shield means, means engaging said flanges and coöperating with the wind shield means for maintaining the latter laterally taut, and clamping strips secured to said frame for holding said wind shield means in extended position.

9. In a vehicle, the combination of a frame, a flexible wind shield coöperating therewith, and adjustable frame means for stretching said shield substantially flatwise across said frame.

10. In a vehicle, the combination of extensible wind shield means, a frame therefor, strips extending longitudinally along the frame and engaging the wind shield means, means extending transversely of said frame and engaging said strips for maintaining said wind shield means laterally and uniformly taut, a clamping strip secured to said frame and means coöperating therewith for holding said wind shield means in extended position.

11. In a vehicle, the combination of extensible wind shield means, a frame therefor having longitudinal edge strips provided with wind shield receiving pins, and clamping strips attached to said frame and overlying said pins and edges of said wind shield means to hold said wind shield means upon the pins and means engaging said pin receiving frame laterally to tension the said wind shield means.

12. In a vehicle, the combination of extensible wind shield means, a frame therefor having longitudinal edge strips provided with wind shield receiving pins, clamping strips attached to said frame and overlying said pins and edges of said wind shield means to hold said wind shield means upon the pins, and tensioning means coöperating with the lateral edges of said wind shield means to maintain the latter laterally and uniformly taut.

13. In a vehicle, the combination of a frame transversely divided into parts hinged together, an extensible wind shield for adjustment along said parts, clamping means on each of said parts for securing said shield thereto, and means engaging said frame to impart lateral and uniform tension to said wind shield while maintaining said shield substantially flat.

14. In a vehicle, a wind shield frame, a flexible wind shield, a roller for said wind shield and having a spring to maintain the wind shield longitudinally taut, edge strips extending longitudinally along said frame and operatively engaging the wind shield, and means engaging said edge strips for holding the wind shield laterally and uniformly taut.

15. In a vehicle, the combination of a frame horizontally hinged to form upper and lower portions, an extensible wind shield for adjustment to any elevation along said portions, and clamping strips having pivotal connections at their ends only to said frame portions, for securing said shield thereto.

16. In a vehicle, the combination of upper and lower frames horizontally hinged together, the upper frame being constructed and arranged to rock down and overlie the lower frame, both of said frames being provided with side guiding members which aline, when the lower frame is upright, thereby to form at each side edge of the frames a straightaway guide, and an extensible wind shield adjustable to extend along said straightaway guiding members of both frames when the upper frame is in its upward position, and adjustable to extend along the lower frame when said upper frame is rocked to overlie the lower frame.

17. In a vehicle, the combination of extensible wind shield means, a frame therefor having edge guiding flanges projecting from its face and between which said wind shield means is extensible, lateral tensioning means engaging said flanges and operatively engaging said wind shield means and clamping strips adjacent said flanges for securing the wind shield means in extended position.

18. In a vehicle, the combination of extensible wind shield means, a frame therefor having edge flanges projecting from its face and between which said wind shield means is extensible, and clamping strips adjacent said flanges and pivoted to said frame for securing the wind shield means in extended position.

19. In a vehicle, the combination of a wind shield composed of upper and lower sections hinged together, an extensible, flexible, shield tensioning strap secured to the vehicle body at its lower end and at its upper end secured to the upper section, said strap tensioning the frame as a whole when the upper section is extended and also when it is folded.

20. In a vehicle, the combination of an extensible wind shield means, a frame therefore having longitudinal edge flanges extending laterally beyond said wind shield means, means engaging said flanges and coöperating with the wind shield means to maintain the latter laterally taut, and clamping strips pivoted at one end thereof only to said frame to hold said wind shield means in extended position.

21. In a vehicle, the combination of extensible wind shield means, a frame therefor, strips extending longitudinally along the frame and having pins engaging openings along the edges of said wind shield, means engaging said strips laterally to tension said shield, and clamping strips each pivoted at one end only and secured to the frame for holding the wind shield in position.

22. In a vehicle, the combination of a frame having upper and lower jointed members, a flexible wind shield adjustable along both of said members, strips extending longitudinally along both of said frame members to engage the edges of said shield, means to engage said strips and tension the shield, and clamping strips secured to the frame and overlying said wind shield to secure it in position.

23. In a vehicle, the combination of a frame having upper and lower jointed members, a flexible wind shield extensible along both of said members, strips extending longitudinally along said frame adjacent the edges of said shield, and having pins to engage openings therein, means to engage said strips and thereby laterally tension said shield, and separate clamping strips for the upper and lower frame members, hinged to the frame to engage the edges of the shield and secure it in position.

24. In a vehicle, the combination of a frame having side and intermediate upright members, independent wind shields guided by said members, means at the outer edges of each of said shields to maintain them laterally taut, and clamping strips along both the inner and outer edges of said shields to maintain said shields in position.

25. In a vehicle, the combination of a frame having upper and lower transversely jointed members, each of said members being composed of two outer uprights and an intermediate upright, two flexible shields adjustable along said uprights, means engaging the inner edge of each of said shields to maintain them in position, and lateral tensioning means to engage the outer edges of said shields and maintain them laterally taut.

In testimony whereof, I have signed my name to this specification in the presence of two subscribing witnesses.

GUY B. COLLIER.

Witnesses:
HENRY T. WILLIAMS,
VINCENT E. DANIELS.